INVENTOR.
GEORGE WESLEY BOYER
BY
Christie, Parker & Hale
ATTORNEYS.

INVENTOR.
GEORGE WESLEY BOYER
BY
Christie, Parker & Hale
ATTORNEYS.

INVENTOR.
GEORGE WESLEY BOYER
BY
Christie, Parker & Hale
ATTORNEYS.

United States Patent Office 3,430,879
Patented Mar. 4, 1969

3,430,879

APPARATUS FOR TRANSPORTING ELONGATED MATERIAL

George Wesley Boyer, Covina, Calif., assignor to Leach Corporation, San Marino, Calif., a corporation of Delaware Filed Mar. 6, 1967, Ser. No. 620,821
U.S. Cl. 242—55.12 22 Claims
Int. Cl. G11b 15/44, 5/00

ABSTRACT OF THE DISCLOSURE

An apparatus for transporting elongated material such as magnetic tape between a pair of side-by-side coaxially aligned reels. An arm rotates around the reel axis adjacent the peripheries of the reels to strip tape from one reel and wind it on the other reel, and the arm carries guide pins or rollers for guiding the tape laterally between the reels. One reel is fixed, and the other reel is driven at constant torque to rotate only enough to compensate for the difference in tape-pack circumference on the reels. A magnetic head is mounted on the arm to record and reproduce data on the tape. Wide reels accept side-by-side wraps of narrow tape for high tape capacity, and a cam reciprocates the arm in a direction parallel to the reel axis to provide level winding of the tape. Data signals and power are fed to the rotating arm through slip rings or rotating transformers.

*Background of the invention*

This invention relates to a tape-transport apparatus capable of handling very long lengths of magnetic tape at a wide range of speeds and at low power consumption. The factors of large tape capacity and widely variable speed permit uninterrupted recording of low-frequency data for extended periods of say several thousand hours, or recording of multi-megacycle data for periods of thirty minutes or more. The apparatus has particular utility in applications such as magnetic recording or playback of data in satellites or other space vehicles, but is also useful to transport other types of elongated material in a variety of environments.

In the past, tape transports have typically used a pair of driven, rotating reels to supply and takeup the tape, and speed control has been maintained by passing the tape over a rotating capstan positioned adjacent a magnetic record or reproduce head. In such known transports, the entire mass of the tape and reels must be continuously rotated, requiring relatively high electrical power and slow start and stop performance. As higher tape speeds are used, the factors of reel unbalance and centrifugal forces arising from the rotating components present a complex problem to recorder designers and users.

Another problem presented by conventional tape transports arises in the recording of multi-megacycle data in instrumentation applications. Recorders capable of handling these data frequencies typically use a rotating head which records transversely or across the width of the tape in separate helical bands. A "dropout" or loss of data can occur during the gap between these bands as the rotating head enters or leaves the edges of the tape. Such dropouts are not a problem in the recording and reproduction of television signals, but often pose a serious limitation when an uninterrupted record of instrumentation data is required.

The apparatus of this invention overcomes these problems and provides a compact, flexible recording instrument capable of operation at both low and high tape speeds. Tape transport between the coaxial reels is accomplished by guiding the tape over a readily balanced arm which orbits or rotates around the periphery of the reels. One reel is fixed in position, and the second reel rotates at a relatively low speed in comparison to conventional transports, thereby minimizing the problems of unbalance forces and disturbance torques. Recording is on a linear, unbroken track along the length of the tape, and the dropout problem presented by rotating-head recorders is avoided. Very long lengths of tape are transported at relatively low power consumption, and bidirectional operation is possible for special applications.

*Summary of the invention*

Briefly stated, the apparatus of this invention is for transporting an elongated material, and includes first and second reels adapted to receive the material. An orbital arm is adapted for rotation around the reels, and carries guide means for guiding the elongated material between the reels. Drive means are provided to rotate the arm continuously around the reels for stripping material from one reel, moving the material over the guide means, and winding the material on the other reel, whereby the material is transported between the reels.

Preferably, the reels are substantially coaxial, and one reel is non-rotatively mounted. The other reel is driven by a constant-torque source to keep the elongated material under tension. The apparatus also preferably includes a sensor mounted on the arm for sensing speed of the elongated material as it moves over the guide means, the sensor having an output coupled to a speed-control means which is in turn operable to vary the speed of the arm drive means to maintain substantially constant the speed of the elongated material moving over the guide means. To provide increased storage capacity, the reels are preferably wider than the elongated material, and a level-wind means is coupled to the arm for cyclically moving the arm parallel to its axis of rotation whereby the material is stripped from and wound on the reels in substantially level layers.

In one form of the invention, the elongated material is an information-storage medium such as magnetic tape. Transducer means such as magnetic record and reproduce heads are mounted on the arm adjacent the material as it passes over the guide means. Connection means such as a set of slip rings or a rotary transformer are provided on the arm for establishing a rotative connection between the transducer means and an external apparatus fixed in position with respect to the arm.

*Brief description of the drawings*

The invention will be described in detail with reference to the attached drawings, in which.

*Description of the preferred embodiment*

Figure 1:
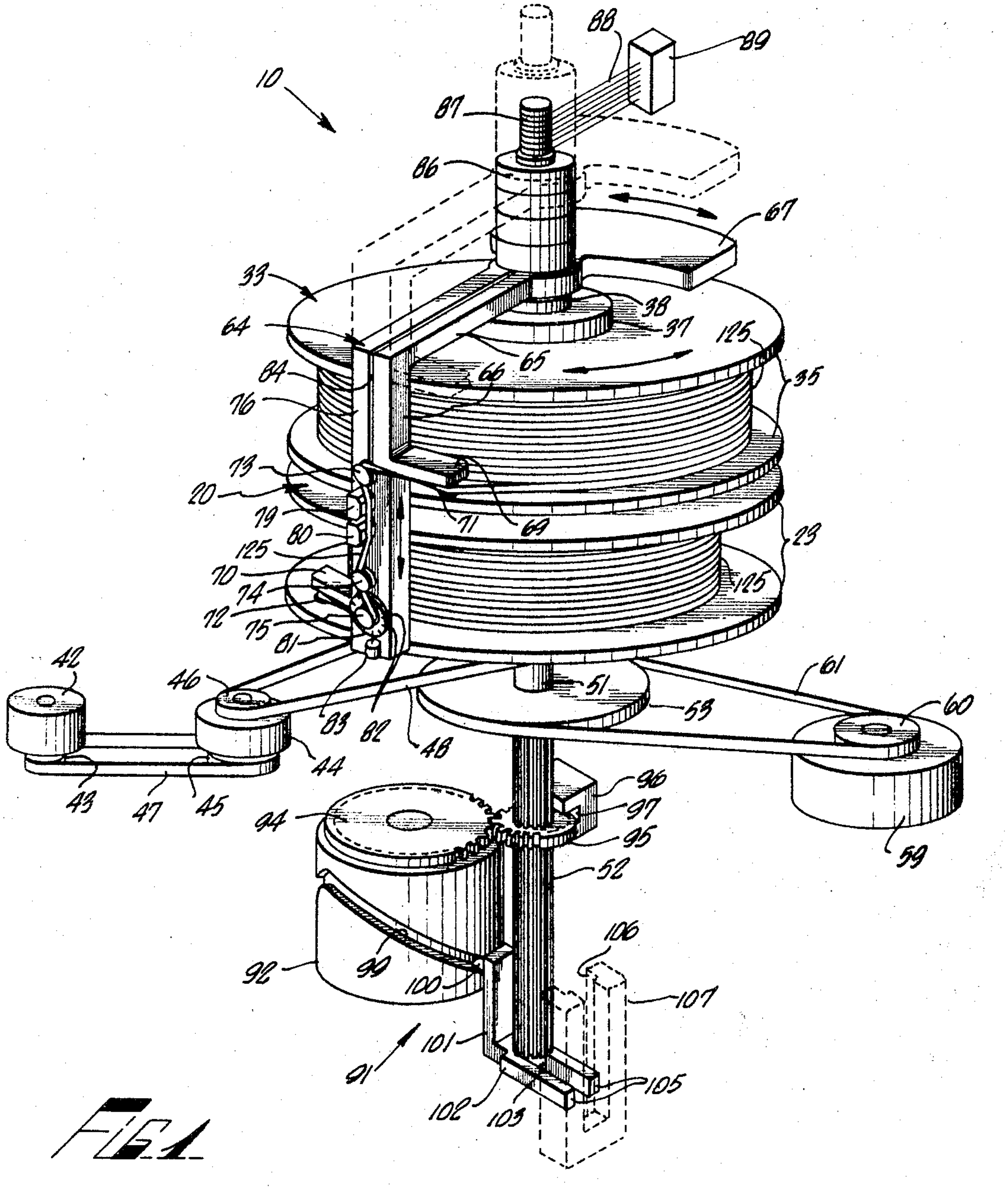
FIG. 1 is a perspective view of the transport apparatus of this invention.
Figure 2:
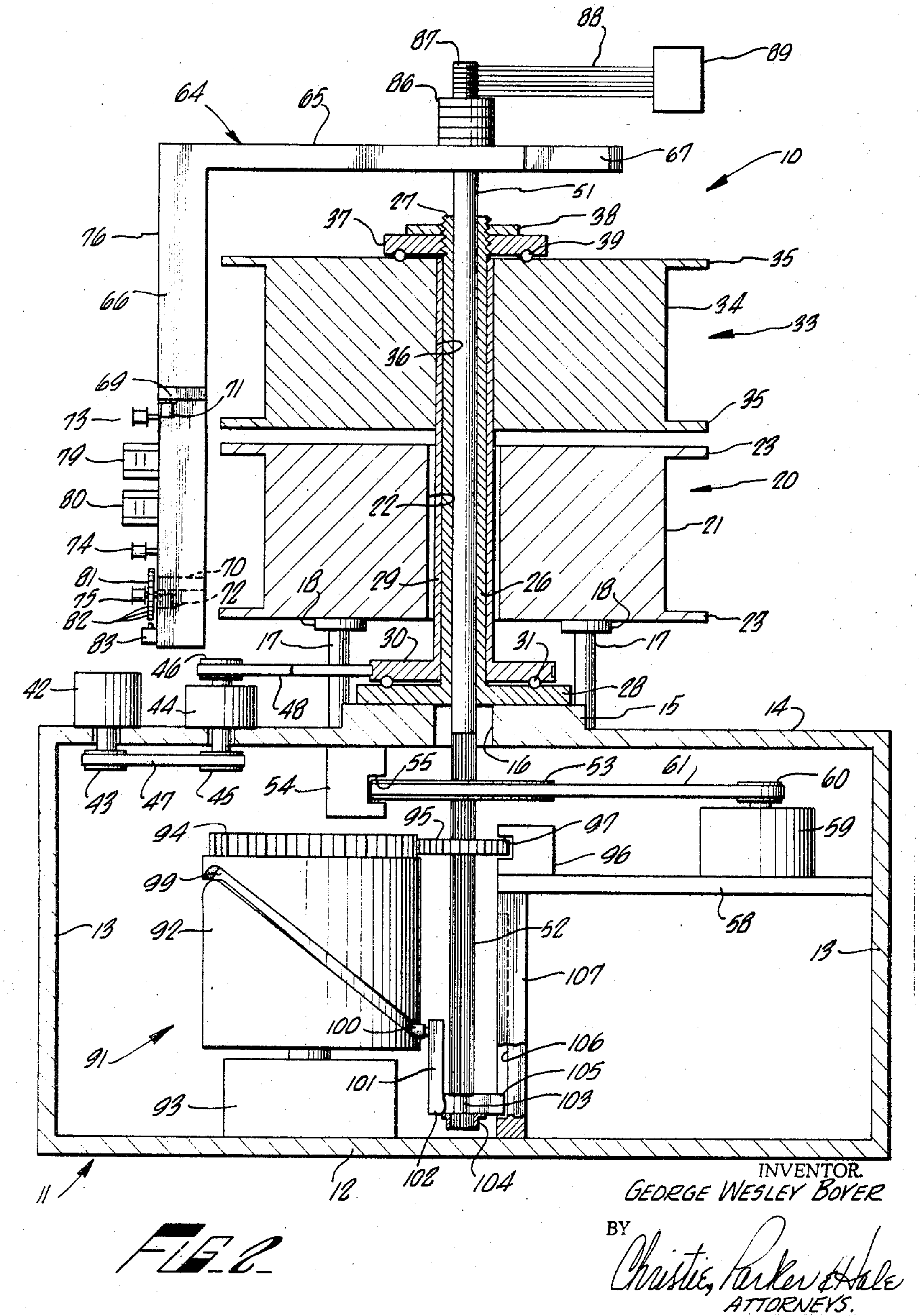
FIG. 2 is a front elevation, partly in section, of the transport apparatus.

The transport apparatus of this invention is shown in FIGS. 1–2 in the form of a magnetic tape transport 10. The transport includes a mounting frame 11 which has been deleted in FIG. 1 for clarity of illustration. The function of the frame is to anchor the various components of the transport in position, and it may be fabricated in a variety of different forms depending upon the packaging requirements of any given application. The frame includes a base 12, and a circular wall 13 extends upwardly from the base. A platform 14 is secured to the upper end of the circular wall, and a raised boss 15 extends upwardly from the central portion of the platform. The raised boss and platform have a central opening 16 therethrough.

A set of mounting posts 17 are secured to and extend upwardly from boss 15, and each post has an enlarged pad 18 at its upper end. A fixed reel 20 is secured to pads 18 by screws (not shown) or any other convenient fastening means. The fixed reel has a hub 21 with a central opening 22 therethrough, and a pair of flanges 23 extend radially outwardly from opposite sides of the hub. The dimensions of the fixed reel are determined by the amount of tape to be accommodated by the transport. When a very narrow tape having a width of say 0.050 inch is used, a fixed reel with a flange diameter of 12 inches, hub outside diameter of 10 inches, and a spacing between the flanges of 4.5 inches will accommodate 150,000 feet of tape for long-duration recording or high-speed operation.

A tubular sleeve bearing 26, shown in FIG. 2, includes threads 27 at its upper end and a radially extending flange 28 at its lower end. Flange 28 is rigidly secured to the upper surface of raised boss 15 on platform 14, and is positioned to place the inner bore of the sleeve bearing in axial alignment with central opening 16 through the boss and platform. A hollow elongated drive tube 29 makes a snug rotation fit over the outer surface of sleeve bearing 26. A pulley 30 is rigidly secured at the lower end (as seen in FIG. 2) of the drive tube. A set of ball bearings 31 are provided between the pulley and flange 28 on the sleeve bearing so the pulley and drive tube can rotate freely with respect to the fixed flange and sleeve bearing.

A rotatable reel 33 includes a hub 34, and a pair of flanges 35 extend radially outwardly from opposite sides of the hub. Hub 34 has a central axial opening 36, and the upper end of drive tube 29 makes a snug fit in the opening. Hub 34 is rigidly secured to drive tube 29 by screws (not shown) or any other convenient fastening means, and the drive tube and reel 33 rotate as a unit. The dimensions of the flanges and hub of the rotatable reel are the same as the corresponding dimensions on the fixed reel so the full quantity of tape stored on one reel may be transferred to the other reel.

Drive tube 29 secured against axial motion on sleeve bearing 26 by a cap 37 screwed on threads 27 at the upper end of the sleeve bearing, and a lock ring 38 screwed on threads 27 against the cap. A set of ball bearings 39 between the cap and rotatable reel 33 permit this reel and drive tube 29 to rotate freely with respect to cap 37 which is fixed in position on the sleeve bearing.

A reel drive motor 42 is mounted on platform 14, and includes a pulley 43 on the motor shaft. A hysteresis clutch 44 of the conventional type is secured to platform 14 adjacent the drive motor, and includes an input pulley 45 and an output pulley 46 secured to respective shafts of the clutch. A first drive belt 47 extends between input pulley 45 and pulley 43 on the reel drive motor, and a second drive belt 48 extends between output pulley 46 and pulley 30 on the drive tube.

It is characteristic of a hysteresis clutch that it delivers a constant output torque in spite of input torque variations within a limited range. Rotation of reel drive motor 42 thereby results in a constant torque being applied to rotatable reel 33 through drive tube 29, the hysteresis clutch, and the belts and pulleys associated with these components.

An arm drive shaft 51 is journaled through the inner bore of sleeve bearing 26 to make a snug rotating fit therein. The drive shaft is substantially longer than the sleeve bearing, and extends both above the top of the sleeve bearing and downwardly through central opening 16 in boss 15 and platform 14. A lower portion of the drive shaft below the sleeve bearing defines a plurality of axially extending splines 52.

A pulley 53 is fitted over the drive shaft to engage splines 52 whereby the shaft and pulley rotate as a unit, but the shaft is free to move axially through the pulley.

A keeper 54, having a slot 55, is rigidly secured to the undersurface of platform 14, and a radially outer portion of pulley 53 passes through the slot. The pulley is thereby confined against axial motion, but is free to rotate with the drive shaft.

A shelf 58 extends laterally inwardly from wall 13, and an arm drive means such as a reversible or bidirectional arm drive motor 59 is rigidly secured to the top surface of the shelf. This motor is preferably a conventional printed-circuit DC servo motor. A pulley 60 is mounted on the output shaft of the arm drive motor, and an arm drive belt 61 extends between pulley 60 and pulley 53 on the arm drive shaft.

A generally L-shaped orbital arm 64 is rigidly secured to the upper end of arm drive shaft 51 above the fixed and rotatable reels. The arm includes a laterally extending portion 65 which projects beyond the periphery of the fixed and rotatable reels, and a transverse portion 66 which extends downwardly (as seen in FIGS. 1 and 2) across and spaced slightly from the outer edges of the reel flanges. The arm also includes a counterweight portion 67 positioned on the opposite side of the arm drive shaft from laterally extending portion 65. The weight and geometry of counterweight portion 67 are selected such that the entire orbital arm and the components mounted thereon are in dynamic balance when the arm is rotated at high speed.

First and second guide-roller mounting members 69 and 70 extend tangentially from opposite sides of the transverse portion of the arm. A first guide roller 71 is rotatably mounted on member 69, and a second guide roller 72 is rotatably mounted on member 70. The axis of rotation of these rollers is oriented parallel to the longitudinal axis of arm drive shaft 51. Third, fourth and fifth drive rollers 73, 74 and 75 are vertically spaced apart, and are rotatably mounted on a radially outer face 76 of transverse portion 66 of the arm. The axis of rotation of these rollers is generally perpendicular to the axis of rotation of arm drive shaft 51. The function of all these guide rollers is to guide tape as it passes over the arm, and some or all of them may be replaced with conventional fixed guide pins as often used in tape transports.

A first magnetic head assembly 79 and a second magnetic head assembly 80 are secured to outer face 76 of the arm between guide rollers 73 and 74 to extend radially outwardly from the outer face. These magnetic head assemblies are of a conventional type, and their configuration will depend upon the requirements of the application in which the tape transport is used. For example, assembly 79 may include two side-by-side recording heads, and assembly 80 may include a pair of side-by-side reproduce heads. If the transport is used for recording only, both assemblies will include record heads which are arranged in interleaved fashion. Similarly, if the transport is used only for the reproduction of data, the assemblies will include interleaved magnetic reproduce heads. It will be clear that only a single magnetic head assembly or more than two such assemblies may be used, depending upon the requirements of any particular recording or playback application.

A speed-sensing means to monitor tape speed includes a disc 81 formed of nonmagnetic material and secured to guide roller 75 to rotate therewith. A plurality of ferromagnetic segments 82 are secured to the disc, and are evenly spaced around its circumference. A reluctance pulse pickup 83 is secured to outer face 76 of the arm adjacent disc 81. Pickup 83 is of a conventional type in which a coil is wound on a small permanent-magnet core. The field of the magnet is varied as ferromagnetic segments 82 rotate past the core of the pickup. A voltage pulse is generated at the coil due to the change in flux surrounding the coil.

Pickup 83 is of the self-generating type, and produces an output pulse each time a ferromagnetic segment passes the pickup core, and the pulse frequency is proportional to the speed of rotation of the disc. This type of rotational speed or angular-velocity transducer is well known and need not be described in detail. Disc 81 and segments 82 may of course be replaced by a toothed gear or any other magnetic body which will periodically vary the magnetic field to produce an output pulse.

Wires (not shown) carrying the electrical signals to and from the magnetic head assemblies and the pulse pickup are secured in a slot 84 (see FIG. 1) and are guided to the center of rotation of the arm where it joins the arm drive shaft. Positioned on top of the arm at the center of rotation is a housing 86 in which electronic components such as preamplifiers (not shown) for the magnetic reproduce heads are secured. A rotative connection means 87 is secured on the top of housing 86, and this means is preferably a conventional slip-ring assembly or a set of rotating transformers. These conventional components are known to those skilled in the art, and will not be described in detail.

A set of leads 88 are coupled between the rotative connection means and external electronic apparatus 89 shown schematically in FIG. 1. Apparatus 89 is fixed in position with respect to the rotating arm, and the rotative connection means establishes an electrical connection between this fixed position and the components on the rotating arm. External electronic apparatus 89 includes such components as record amplifiers, power supplies and the like.

A level-wind means 91 includes a drum 92 rotatively mounted on a boss 93 secured to base 12. A driven gear 94 is secured on the top surface of the drum, and meshes with a drive gear 95 fitted over splines 52 on the arm drive shaft. The drive gear rotates with the arm drive shaft, and the shaft is free to move axially through the gear. The drive gear is constrained against axial motion with the shaft by a keeper 96 rigidly secured to shelf 58. The drive gear fits in a slot 97 in the keeper and is thus prevented from moving axially with the arm drive shaft.

A continuous cam slot 99 is cut around the periphery of drum 92, and a cam-follower roller 100 rides in the slot. Roller 100 is secured to an L-shaped bracket 101 having a yoke 102 fitting in an annular groove 103 cut adjacent the lower end of arm drive shaft 51. A hollow sleeve 104 is rigidly secured to the undersurface of the yoke, and makes a slip fit over the lower end of the arm drive shaft to support the bracket. Ends 105 of yoke 102 fit into a pair of vertically elongated slots 106 in a brace member 107 secured to and extending between base 12 and shelf 58.

Yoke ends 105 are free to move vertically (as seen in FIG. 2) in slots 106, but the yoke and bracket 101 are constrained against rotation as the yoke ends bear against the sides of the slots. Arm drive shaft 51 is free to rotate within yoke 102, and the yoke and drive shaft move together vertically as the yoke fits snugly within annular groove 103 on the shaft. As the drum rotates, roller 100 follows cam slot 99 and the bracket is forced to move vertically, resulting in a cyclic or oscillating axial translation of the arm drive shaft and orbital arm 64. The contour of cam slot 99 is selected in the usual fashion to shuttle the arm axially to provide level winding of the tape on the reel hubs, and to prevent a buildup or "meniscus" of tape at the edges of the hubs. This controlled distribution of tape on the reels avoids tape deformation and maximizes the amount of tape which can be wound on the reels.

The mechanical components illustrated in FIGS. 1 and 2 have been shown semi-schematically in a fashion which it is believed most clearly illustrates the principle of the invention. Various refinements and modifications may be made to suit the transport to the requirements of a particular application. For example, when the transport is to be used in an environment where it will be subjected to acceleration forces, the arm drive shaft is preferably supported in linear ball bearings positioned inside conventional ball bearings to provide a secure, low-friction mounting which permits free movement of the arm both axially and rotationally. Similarly, different types of rotational connection means to couple the electrical components of the transport to external electronic or electrical apparatus may be used. In a presently preferred form of the invention, slip rings are used to transmit power to reproduce head preamplifiers mounted on the arm, and to transmit pulses generated by pickup 83 which measures tape speed. Rotary transformers are preferred for coupling the magnetic-head input and output signals to external electronic components.

Figure 3:
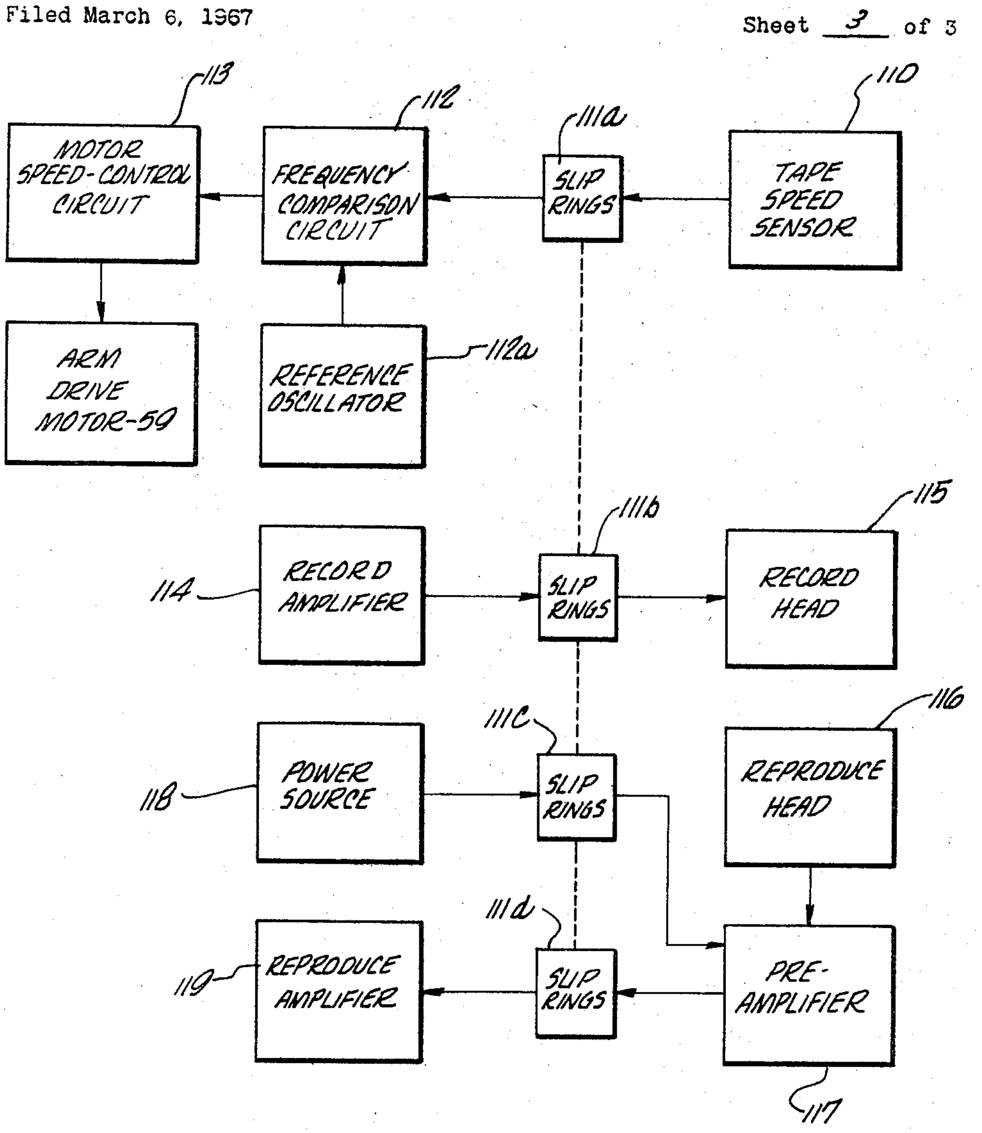
FIG. 3 is a block diagram of electrical components used in the transport apparatus.

The electrical components associated with the tape transport are illustrated in block diagram form in FIG. 3. An output signal from a tape speed sensor 110 (such as reluctance pulse pickup 83 described above) is fed through slip rings **111*a* to a conventional frequency comparison circuit 112. A conventional reference oscillator 112*a*** generates an AC signal having a frequency proportional to the desired tape speed, and this signal is also coupled to the frequency comparison circuit.

The frequency comparison circuit generates an output whenever there is a difference in the frequencies of the two input signals, and this output is coupled to a conventional motor speed-control circuit 113. The speed-control circuit in turn has an output which drives arm drive motor 59. Deviations from proper tape speed are thus detected, and a correction signal generated by the frequency comparison circuit commands the speed-control circuit to increase or decrease the speed of the arm drive motor as required to bring the tape speed back to the desired value. Conventional phase-lock servo-control circuitry is well suited to this application. This type of circuitry is well known, and, for brevity, will not be described in detail.

An input signal to be recorded is fed to a conventional record amplifier 114, and the output of the record amplifier is coupled through slip rings **111*b* to a record head 115 in magnetic head assembly 79 for example. A reproduce head 116, in magnetic head assembly 80, for example, generates an output signal which is coupled to a conventional preamplifier 117 mounted in housing 86 on the top of the orbital arm. Operating power for the preamplifier is provided by an external power source 118 coupled through slip rings 111*c* to the preamplifier. The output signal of the preamplifier is coupled through slip rings 111*d* to a conventional reproduce amplifier 119**. The output of the reproduce amplifier is in turn fed to signal-processing and display apparatus, or similar equipment (not shown). A plurality of record or reproduce channels may of course be used, and an appropriate number of record or reproduce heads and corresponding amplifiers is provided to handle the desired number of signals.

In operation, transport 10 is assembled with any desired length of magnetic tape 125 (see FIG. 1) spooled on either fixed reel 20 or rotatable reel 33. In the following discussion, it will be assumed that the rotatable reel initially holds the entire length of tape. The transport is readily adapted for use with any conventional tape width by providing guide rollers 71–75 in a corresponding width, and by providing magnetic head assemblies 79 and 80 with an appropriate number of tracks to accept the number of separate input channels to be recorded.

As shown in FIG. 1, the transport is threaded by passing the leading end of the tape over roller 71, and then forming a half twist in the tape. The tape is then threaded over rollers 73, 74 and 75 so it passes over head assemblies 79 and 80 in contact with the individual magnetic heads in these assemblies. As the tape leaves roller 75, it is given a second half twist (in a direction opposite to the half twist introduced between rollers 71 and 73) to pass over roller 72, and the leading end of the tape is then secured (by adhesive tape or any other conventional means) to hub 21 of the fixed reel.

Arm drive motor 59 and reel drive motor 42 are then actuated to operate the transport. To transfer tape from the rotatable reel to the fixed reel, arm 64 is rotated in a counterclockwise direction when viewed from above in FIG. 1. As the arm orbits or rotates around the periphery of the rotatable reel, tape is stripped from this reel by roller 71, is guided over the magnetic head assemblies by rollers 73, 74 and 75, and finally is wound on the fixed reel as it leaves roller 72.

While the arm is rotoating continuously around the periphery of the reels, arm drive shaft 51 is simultaneously rotating drum 92 in the level-wind mechanism through gears 95 and 94. As the drum rotates, cam-follower roller 100 follows cam slot 99 in the drum, forcing bracket 101 and the arm drive shaft to move cyclically in accordance with the curvature of the cam slot. That is, the level-wind mechanism forces arm drive shaft 51 to move axially (or vertically as seen in FIGS. 1 and 2) in oscillatory fashion, whereby arm 64 which is rigidly secured to the arm drive shaft has a similar motion. Transverse portion 66 of the arm thus shuttles back and forth across the width of the reel hubs, and tape is stripped from and deposited on the reels in level helical coils.

It is important to recognize that transport of the tape from one reel to the other reel is accomplished by the rotary or orbital motion of the arm, and not by rotation of both reels as in a conventional tape transport. Relative rotation between the fixed and rotatable reel in the transport of this invention is required only to maintain tension in the tape as it is transported. This feature can be understood from the following discussion of relative reel motion with varying circumference of the tape "pack" on each reel. The clockwise or counterclockwise directions of rotoation discussed below are with reference to an observer who is viewing the transport as seen in FIG. 1 from above.

Assume that rotatable reel 33 is fully wound with tape, and the circumference of the tape pack is thus relatively large. In this condition, only a few turns of tape as necessary for threading purposes will be wound on fixed reel 20, and the circumference of this tape pack will thus be relatively small. For convenience, the radius of the tape pack on the rotatable reel and the fixed reel will hereafter be referred to as $r_1$ and $r_2$ respectively.

When arm 64 makes one revolution around the reels, a segment of tape having a length equal to $2\pi_2$ will be wrapped on the fixed reel. If the rotatable reel was fixed in position, the segment of tape stripped from this reel during one revolution of the arm would have a length equal to $2\pi r_1$, and this length would exceed the length of the segment deposited on the fixed reel because $r_1$ is greater than $r_2$. Slack would thus develop in the tape, and an undesirable loss of intimate contact of the tape with the magnetic head assemblies would result.

To avoid this loss of tape tension, the torque-imparting means consisting of reel drive motor 42 and hysteresis clutch 44 (and associated belts and pulleys) delivers a light torque to the rotatable reel urging it in a counterclockwise direction. As the arm rotates through one revolution, the rotatable reel thus rotates in the same direction through a fraction of a revolution whereby the length of tape actually stripped from the rotatable reel is equal to $2\pi r_1$, and tape tension is maintained.

When approximately one-half of the tape originally wound on the rotatable reel has been transferred to the fixed reel, $r_1$ and $r_2$ become equal. In this condition, a length of tape is stripped from the rotatable reel which is precisely equal to the length of tape wound on the fixed reel during one revolution of the arm. The rotatable reel thus remains absolutely stationary with respect to the fixed reel. A constant torque is still delivered to the rotatable reel to maintain the tape under tension, and the hysteresis clutch "slips" as the rotatable reel (and hence output pulley 46 on the clutch) is stationary.

When the supply of tape on the rotatable reel is almost exhausted, and the fixed reel is almost full, $r_2$ becomes substantially larger than $r_1$. That is, the length of tape deposited on the fixed reel during one revolution of the arm is longer than the length of tape which would be stripped from the rotatable reel if it remained fixed in position. The tension on the tape in this condition is sufficient to overcome the torque imparted by hysteresis clutch 44, and output pulley 46 of the clutch is driven in a reverse direction as the rotatable reel revolves in a clockwise direction to "aid" the rotatable arm in stripping off the length of tape being wound on the periphery of the tape pack on the fixed reel. The torque delivered by the hysteresis clutch is only sufficient to maintain a relatively light tension (in the range of ounces) in the tape. Variations in tape tension during a complete reeling cycle are relatively small, typically falling in the range of 15 to 20 percent.

It will be clear from the above discussion that both of the reels in the transport could be fixed in position if only a relatively small amount of tape is to be transferred during a full reeling cycle whereby $r_1$ and $r_2$ remain at all times substantially equal. In this kind of operation a satisfactory tape storage or reel means would consist of a single fixed reel. For most applications, however, a long length of tape is desired for either long-duration recording or high-speed operation, and some means for imparting a substantially constant torque to the rotatable reel is therefore desirable.

The invention is not limited to the use of a hysteresis clutch to supply torque to the rotatable reel, and other mechanisms are equally useful and are within the scope of the invention. For example, a servo-control system or the well-known "Negator" spring can be used in the transport to impart a relatively constant torque to the rotatable reel. It is also within the scope of the invention to mount both reels to be rotatable, whereby the circumference-variation compensation is shared by both reels. In a presently preferred form of the invention, however, it is believed that maintaining one reel in a fixed position has the advantage of mechanical simplicity.

In a preferred form of the transport, arm drive motor 59 is reversible whereby bidirectional operation of the transport may be achieved. The rotating components of the transport are inherently well suited for bidirectional operation, and the several guide rollers on the arm function equally well for either direction of tape motion. Bidirectional operation is of course desirable when rewinding (at perhaps a higher speed than that used during recording) is required, and is also useful in long-duration recording where multiple passes of the tape are made to record a plurality of parallel tracks on the tape in time-serial fashion.

Control of tape speed in any of the above-described operating modes is provided by a tape speed sensor (such as reluctance pulse pickup 83) operating in conjunction with the motor speed-control circuitry already discussed. The invention is of course not limited to the use of a reluctance pulse pickup for speed sensing. For example, various optical techniques may be used for sensing the rotational speed of disc 81. Alternatively, a pre-recorded constant-frequency reference signal on a reference track on the tape can be sensed by a reproduce head, and the output signal from the reproduce head fed to circuits such as frequency comparison circuit 112 operating in conjunction with reference oscillator **112*a*** to feed error signals to the motor speed-control circuit which controls the arm drive motor. The transport is operable over a very wide range of tape speeds, and is believed to be useful at low speeds such as 0.1 inch per second as well as at very high speeds such as 1,000 inches per second. This wide speed range provides a degree of flexibility not previously available in conventional tape transports.

It will be clear from the geometry of the transport components that the orbital arm and the reels should preferably be coaxial for smooth operation and tape spooling. The axes of the arm and rotatable reel are their axes of rotation, and the axis of the fixed reel is that axis around which the tape is essentially concentrically wound. Departures from this preferred coaxial alignment are acceptable, however, and such embodiments are within the scope of the invention.

There has been described a novel tape transport in which inter-reel movement of the tape is accomplished by an arm which rotates around the periphery of the reels. The transport is simple in mechanical design, and consumes a relatively small amount of electrical power in opeartion. The capability of accepting extremely long lengths of magnetic tape, coupled with a very broad operating-speed range, makes the transport suitable for application for use in a variety of different recording and playback applications.

Although the invention has been described in terms of a transport for magnetic tape, it is to be understood that the concept of the invention is equally useful for transporting other types of elongated strip materials. The scope of the invention, as defined in the following claims, is intended to cover all such variations and modifications.

What is claimed is:

1. Apparauts for transporting an elongated material, comprising:

first and second reels adapted to receive the material;
an orbital arm adapted for rotation around the periphery of the reels;
guide means mounted on the arm and adapted for guiding the material between the reels; and
arm drive means to rotate the arm continuously around the reels for stripping the material from one reel, moving the material over the guide means, and winding the material on the other reel, whereby the material is transported between the reels.

2. The apparatus defined in claim 1 in which the first and second reels and the orbital arm are in coaxial alignment.

3. The apparatus defined in claim 2 in which the first reel is rotatable with respect to the second reel.

4. The apparatus defined in claim 3 and further comprising second drive means coupled to the first reel for imparting a torque force to the first reel whereby the elongated material is tensioned.

5. The apparatus defined in claim 4 in which the arm drive means is operable at a variable speed, and further comprising speed-control means coupled to the arm drive means and including a sensor on the arm for sensing speed of the elongated material as it moves over the guide means, the speed-control means being operable to vary the speed of the arm drive means to maintain substantially constant the speed of the elongated material as it moves over the guide means.

6. The apparatus defined in claim 4 in which the reels are wider than the elongated material, and further comprising shuttle means coupled to the orbital arm for cyclically moving the arm parallel to its axis of rotation whereby the mterial is wound in substantially level layers on said other reel.

7. The apparatus defined in claim 4 in which the first drive means is reversible whereby the material is bidirectionally transferable between the reels.

8. The apparatus defined in claim 4 in which the elongated material is an information storage medium, and further comprising connection means on the arm for establishing a rotative connection between the arm and an external apparatus fixed with respect to the arm, and transducer means on the arm adjacent the material as it passes over the guide means and coupled to the connection means for conveying information between the material and the connection means.

9. A magnetic-tape transport, comprising:

a frame;
first and second reels mounted on the frame in substantially coaxial alignment and adapted to receive the tape;
an orbital arm rotatively mounted on the frame and having an axis of rotation in substantially coaxial alignment with the reels;
guide means mounted on the arm and adapted for guiding the tape between the reels;
a magnetic head mounted on the arm;
rotative connection means mounted on the arm and connected to the magnetic head for coupling the head to an external apparatus fixed in position with respect to the arm;
arm drive means mounted on the frame and coupled to the arm to rotate the arm continuously around the reels for stripping the tape from one reel, moving the tape over the guide means and the magnetic head, and winding the tape on the other reel, whereby the tape is transported between the reels.

10. The transport defined in claim 9 in which the first reel is rotatably mounted on the frame.

11. The transport defined in claim 10, and further comprising torque means mounted on the frame and connected ot the first reel for imparting a torque force tending to rotate the first reel with respect to the second reel.

12. The transport defined in claim 10 in which the torque force imparted by the torque means is substantially constant as tape is transferred between the reels.

13. The transport defined in claim 11 in which the torque means comprises a motor, a hysteresis clutch having input and output shafts, means coupling the motor to the input shaft, and means coupling the output shaft to the first reel.

14. The transport defined in claim 9 in which the arm drive means comprises a variable speed motor, and further comprising speed-sensing means mounted on the arm for monitoring the speed of the tape as it passes over the guide means and having an output signal representing tape speed, reference means for generating a reference signal proportional to a desired tape speed, comparison means coupled to the speed-sensing means and the reference means to receive the output signal and reference signal, the comparison means having an error-signal output when the signals deviate from a predetermined relationship, and motor speed-control means coupled to the comparison means to receive the error signal and coupled to the variable speed motor to control the speed thereof in response to the error signal whereby the tape speed is maintained substantially constant.

15. The transport defined in claim 9 in which the orbital arm is mounted to be movable in a direction parallel to the axis of rotation whereby a portion of the arm can be shuttled across the width of the reels.

16. The transport defined in claim 15 and further comprising level-wind means mounted on the frame and coupled to the arm to move the arm cyclically in a direction parallel to the arm axis of rotation as tape is transported between the reels.

17. The transport defined in claim 9 in which the arm drive means is reversible whereby the arm is bidirectionally rotatable to transfer tape in either direction between the reels.

18. The transport defined in claim 9 in which the rotative connection means comprises slip rings.

19. The transport defined in claim 9 in which the rotative connection means comprises a rotary transformer.

20. The transport defined in claim 9 in which the guide means includes a first roller mounted on the arm in lateral alignment with the first reel, and a second roller mounted on the arm in lateral alignment with the second reel.

21. The transport defined in claim 9 in which the first reel is rotatably mounted on the frame, the second reel is fixed to the frame, and the orbital arm is mounted to be movable in a direction parallel to the axis of rotation, and further comprising torque means mounted on the frame and connected to the first reel for imparting a substantially constant torque force tending to rotate the first reel with respect to the second reel, and level-wind means mounted on the frame and coupled to the arm to move the arm cyclically in a direction parallel to the arm axis of rotation as tape is transported between the reels.

22. A magnetic-tape transport, comprising:

a frame;

reel means mounted on the frame and adapted to receive the tape;

an orbital arm rotatively mounted on the frame and having an axis of rotation in substantially coaxial alignment with the reel means;

guide means mounted on the arm and adapted for guiding the tape to and from the reel means;

a magnetic head mounted on the arm;

rotative connection means mounted on the arm and connected to the magnetic head for coupling the head to an external apparatus fixed in position with respect to the arm;

arm drive means mounted on the frame and coupled to the arm to rotate the arm continuously around the reel means for serially stripping the tape from the reel means, moving the tape over the guide means and the magnetic head, and winding the tape on the reel means.

References Cited

UNITED STATES PATENTS

| | | | |
|---|---|---|---|
| 2,554,354 | 5/1951 | Williams et al. | 242—54.1 X |
| 2,616,982 | 11/1952 | Gray et al. | 179—100.2 |
| 3,149,207 | 9/1964 | Maxey | 179—100.2 |

LEONARD D. CHRISTIAN, *Primary Examiner.*

U.S. Cl. X.R.

179—100.2